Sept. 8, 1925.
G. G. VON ARCO
1,552,781
ARRANGEMENT FOR CONTROLLING THE DRIVING MOTORS IN HIGH FREQUENCY MACHINES
Filed Dec. 7, 1923
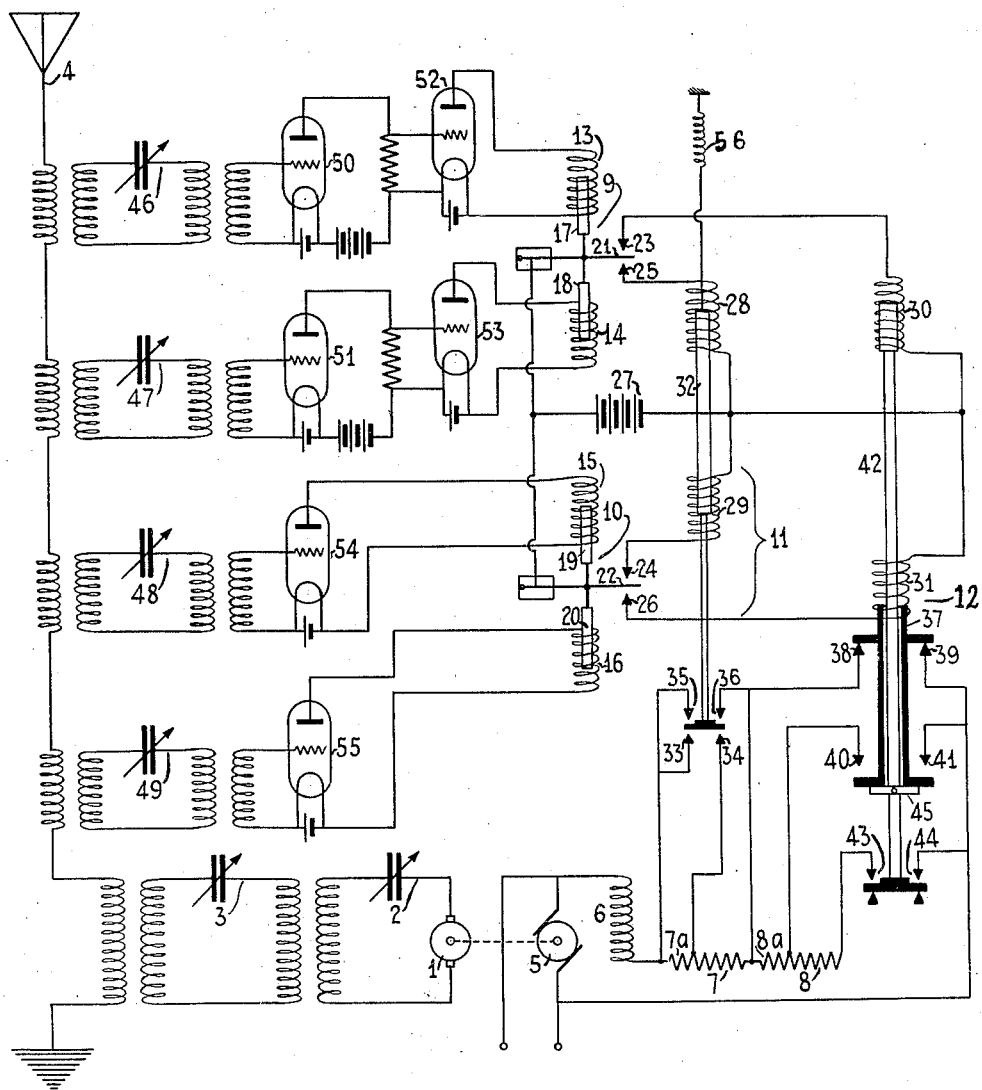
Inventor
GRAF GEORG VON ARCO
By his Attorney Patented Sept. 8, 1925.

1,552,781

UNITED STATES PATENT OFFICE.

GRAF GEORG VON ARCO, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

ARRANGEMENT FOR CONTROLLING THE DRIVING MOTORS IN HIGH-FREQUENCY MACHINES.

Application filed December 7, 1923. Serial No. 679,258.

*To all whom it may concern:*

Be it known that I, GRAF GEORG VON ARCO, a citizen of the Republic of Germany, and a resident of Hallesches Ufer 12/13, Berlin, S. W. 11, Germany, have invented new and useful Improvements in Arrangements for Controlling the Driving Motors in High-Frequency Machines, for which I have filed an application in Germany on Aug. 2, 1921, and of which the following is a specification, accompanied by drawings.

The necessity of providing means for controlling the rotation of high frequency machines is well known. In order fully to utilize the modern, wide-range, selecting means provided in the receiver, it is necessary to transmit an exceptionally constant frequency.

Generally speaking, the principle of controlling the rotation of the driving motors of high frequency machines consists in using the "normal circuit," that is, an oscillating circuit which contains constant values of capacity, inductance, resistance, etc., and which is brought into function in case of a change in the frequency of the machine caused by variations in its speed of rotation. If in addition to this, such a sensitive means as, for example, the so-called "phase leap" is used, together with cathode tubes as rectifier and amplifier, in order to obtain in response to the slightest phase displacement direct current of varying direction and strength, a very sensitive indicating apparatus is provided. However, a further difficulty is encountered in connecting the indicating arrangement with the driving motor as an operative regulator. A polarized relay which is actuated by the varying direct current has been used in the past for actuating high potential current switches for the purpose of controlling the driving motor in such a manner that its speed of rotation will remain the same even in case there are variations in the current supply. This is possible as long as the variations in the current supply remain within certain limits. However, if these variations exceed certain predetermined limits, the correcting stages will usually no longer suffice for speeding up and slowing down the motor, and if they are made great enough to be sufficient, then the difficulty arises that these large stages are continuously switched in and out when the machine varies from its normal speed of rotation. The correcting action of the switches is too strong, and on account of this the switches must be made to stand strong currents and must therefore be very heavy. Due to this they will have a considerable time constant and operate sluggishly. It has been proposed to remedy this by connecting in parallel with the controlling relay a time relay which will be actuated when the controlling relay remains in the same position for a predetermined period of time, that is, when the attempted correction in the speed of rotation of the motor is not made within the period of the time relay. By means of this time relay, a larger resistance value may be connected in or cut out of the circuit.

However, this arrangement has the disadvantage among others that it takes too long a time to make the large corrections which correspond to strong fluctuations in the current supply, and during this time the speed of rotation of the machine is left uncorrected.

The purpose of the present invention is to provide a speed regulating arrangement which effects a cascade regulation and operates with greater quickness and reliability than speed regulating arrangements of previously known types.

The invention consists in providing means for fine regulation and coarse regulation of such character that either of said means, as may be required, may be quickly rendered effective upon change in the speed of the motor. In the illustrated arrangement, members for coarse correction are provided in addition to the usual regulating means and are switched in and out by means which in case of large and abrupt variations in the speed of the machine may be actuated from the "normal circuit," e. g. by means of cathode tubes, substantially as quickly as can the controlling means for effecting the close regulation.

This application is a continuation in part of my application for Letters Patent of the United States, Serial No. 579,502, filed August 3, 1922.

The single figure of the drawing is a diagrammatic representation of a circuit arrangement embodying the invention.

In the drawing in which one way of carrying the invention into practice is illustrated by way of example, 1 is a high frequency machine which supplies current to the aerial 4 through intermediate circuits 2 and 3 which may serve as frequency raisers; 5 is a direct current driving motor having an exciting winding 6; and 7 and 8 are resistances inserted in the exciting circuit of the motor 5. The regulation of the machine is accomplished by the aid of two controlling relays 9 and 10, which operate two switches 11 and 12, adapted to cut in and out of circuit the resistances 7 and 8. Each of said controlling relays 9 and 10 is furnished with two coils 13, 14 and 15, 16 respectively, which, upon being energized are capable by the aid of magnetic cores 17, 18 and 19, 20 respectively, of moving armatures or keepers 21, 22 respectively, whereby either the upper contacts 23, 24 or the lower contacts 25, 26 may be caused to close, the said contacts being contained in the circuits of a common battery 27 in such a manner that upon one of the contacts being closed, the corresponding unit of the four coils 28, 29 and 30, 31 respectively of the switches 11 and 12 will receive current. Upon coil 29 attracting core 32, the two lower contacts 33, 34 of switch 11 will be bridged, with the consequence that a small portion 7ᵃ of resistance 7 is short-circuited. By the action of coil 28 upon core 32, on the other hand, contacts 35, 36 will be bridged over, and thereby the entire resistance 7 will be short-circuited. The switch 12 is bipartite, the tubular part 37 normally bridging two contacts 38, 39, the action of which is to cut resistance 8 out of the exiting circuit of the motor 5. When the part 37 is attracted by coil 31, it bridges contacts 40, 41 and opens the contacts 38, 39, thus connecting the smaller part 8ᵃ of resistance 8 into the exciting circuit of the motor 5. The core part 42 of the switch 12 is capable of being attracted by the coil 30 to raise the tubular part 37 through the agency of a collar or flange 45 on the core 42, thus interrupting the circuit between the contacts 38, 39 and to close contacts 43, 44 so as to cause the entire resistance 8 to be inserted into the exciting circuit of the motor.

The four coils of the control relays 9 and 10 are fed from four high-frequency circuits 46, 47, 48 and 49, coupled with the antenna 4. As shown, hot cathode tube amplifiers 50, 51 and rectifiers 52, 53 are inserted between circuits 46, 47 and coils 13, 14 respectively, whereas rectifiers 54, 55 only are inserted between circuits 48, 49 and coils 15, 16.

Circuits 47 and 48 are tuned to a frequency above the frequency which it is desired to radiate from the antenna 4, while circuits 46 and 49 are tuned below the same, 47 being more markedly dissyntonized or detuned than 48, and 46 more than 49. If, then, the speed of the machine experiences a small increase with the consequence that the frequency grows, circuit 48 will be excited and the coil 15 of relay 10 will receive current and close the contact 24. This causes downward movement of core 32 by attraction by coil 29 against the action of a yielding support 56 for the core 32 and consequent closing of contacts 33, 34 and short-circuiting of resistance 7ᵃ. Hence, the speed of the motor 6 will be diminished. However, if the machine undergoes a marked increase in speed, circuit 47 will be excited with the result that coil 28 will attract the core 32. If the attractive force of coil 28 is stronger than that of coil 29, core 32 will be raised to cause the switch 11 to close contacts 35, 36 and thereby cause the entire resistance 7 to be short-circuited. A far greater compensating effect is thus brought about than in the event of a small deviation.

When, on the other hand, the speed of the motor 5 falls slightly below normal, the circuit 49 will be energized thus causing the coil 16 to attract the core 20 of the relay 10 to close the contact 26. The closing of contact 26 causes current to flow from the battery 27 through coil 31 of the switch 12, with the result that the tubular part 37 of the switch 12 is moved upwardly by the coil 31 to close contacts 40, 41 and open contacts 38, 39 thus connecting the portion 8ᵃ of the resistance 8 into the exciting circuit 6 of the motor 5 and increasing the speed of the motor. However, if the motor 5 undergoes a large decrease in speed, the circuit 46 will be energized, thus causing current to be set up from the battery 27 through the coil 30 of the switch 12. The current attracts the core 42 of the switch upwardly and closes contacts 43, 44 thereby connecting the entire resistance 8 into the exciting winding of the motor 5 and exerting the maximum compensating effect in increasing the speed of the motor.

It will be understood from the foregoing that the arrangement according to this invention has the advantage that the special controlling means for effecting large stage compensations becomes energized only when a large variation occurs which is not compensated by the devices for effecting fine regulation. On the other hand, this arrangement has the advantage over the method employing a time relay, for example, that the means for accomplishing close regulation makes possible very slight corrections which are continuously switched in and out for maintaining a mean position, whereas the means for making large corrections, which involves the switching in and out of large masses of energy, is actuated only rarely but then immediately.

The regulating arrangement is such that the net work is first brought to a slight variation, and then the variation is compensated at the motor.

Having described my invention, what I claim is:

1. An arrangement for controlling the driving motors in high frequency machines, comprising an exciting circuit for the motor, a switch connected with said circuit and operable in one way to correct a small variation in the speed of the motor and in another way to correct a large variation in the same sense in the speed of the motor, means controlled by the current generated by the machine for operating the switch in either of said ways, a second switch for correcting large and small variations in the speed of the motor in the opposite sense, and means also controlled by the current generated by the machine for controlling the action of the last-mentioned switch.

2. An arrangement for controlling the driving motors in high frequency machines, comprising a transmission conductor, circuits coupled to the transmission conductor, said circuits including a pair of circuits tuned to frequencies less that the frequency which it is desired to transmit from the transmission conductor and also including a pair of circuits tuned to frequencies greater than that which it is desired to transmit from the transmission conductor, one of each of said pairs of circuits being detuned with respect to the desired frequency to a less extent than the other of said circuits, relays controlled by said circuits, and switch mechanism independently controlled by said relays for effecting fine and coarse regulation of the speed of the motor under the control of the circuits which are detuned to the lesser and greater extent respectively.

3. In a frequency regulating system, an alternator and a driving motor therefor, a circuit for said motor, large and small resistances in said circuit, switching means for selectively cutting out both resistances or the large resistance alone or cutting in both resistances and means responsive to the output of the alternator for controlling said switching means.

4. In a frequency regulating system, an alternator and a driving motor therefor, a circuit for said driving motor including a large and a small resistance, switching means having a plurality of active positions in one of which positions it cuts out both resistances and in another of which positions it cuts out the large resistance alone, means responsive to the alternator output for selectively and independently operating said switching means to its several active positions.

5. In a frequency regulating system an alternator and a driving motor therefor, a circuit for said motor including a large and a small resistance, a switching member movable to two active positions in one of which it cuts out both resistances and in the other of which it cuts out the large resistance alone, means responsive to the alternator output for selectively moving said switching member to its two active positions, a second switching member movable from a neutral position to a position in which it cuts in both resistances, said second switching member comprising means for rendering said first named switching member inactive and independent means responsive to the alternator output for operating said second named switching member.

6. In a motor speed control system, a motor, a field circuit for said motor including a large and a small resistance, a switching member having two active positions in one of which it cuts out the large resistance alone and in the other of which it cuts out both resistances, means for selectively operating said switch to its two active positions, a second switch member movable from a neutral position to a position in which it cuts in both resistances, said second switch member comprising means for moving said first named switch member to inactive position and independent means for operating said second named switch member.

GRAF GEORG v. ARCO.